United States Patent
Kuniba

(10) Patent No.: US 8,558,927 B2
(45) Date of Patent: Oct. 15, 2013

(54) IMAGE PROCESSING APPARATUS HAVING A GRADATION CONVERSION UNIT THAT EXECUTES GRADATION CONVERSION PROCESSING, AND IMAGE PROCESSING METHOD FOR THE SAME

(75) Inventor: Hideyasu Kuniba, Tokyo (JP)

(73) Assignee: Nikon Corporation, Tokyo (JP)

( * ) Notice: Subject to any disclaimer, the term of this patent is extended or adjusted under 35 U.S.C. 154(b) by 767 days.

(21) Appl. No.: 12/450,283

(22) PCT Filed: Mar. 26, 2008

(86) PCT No.: PCT/JP2008/055666
§ 371 (c)(1),
(2), (4) Date: Sep. 18, 2009

(87) PCT Pub. No.: WO2008/117818
PCT Pub. Date: Oct. 2, 2008

(65) Prior Publication Data
US 2010/0097482 A1    Apr. 22, 2010

(30) Foreign Application Priority Data
Mar. 26, 2007  (JP) ................. 2007-079157

(51) Int. Cl.
*H04N 5/202* (2006.01)
(52) U.S. Cl.
USPC ....................... 348/254; 348/222.1
(58) Field of Classification Search
USPC ......... 348/272, 273, 274, 703, 254, 255, 256, 348/251, 222.1, 221.1, 229.1, 453, 649; 382/162, 167, 254, 255, 256
See application file for complete search history.

(56) References Cited

U.S. PATENT DOCUMENTS

| 5,555,031 | A  | * | 9/1996 | Van Rooij ............... 348/645 |
| 6,677,959 | B1 |   | 1/2004 | James |
| 6,762,793 | B1 |   | 7/2004 | Fukushima et al. |
| 2004/0085459 | A1 | | 5/2004 | Hoshuyama et al. |
| 2004/0212739 | A1 | | 10/2004 | Kiuchi et al. |
| 2005/0013506 | A1 | | 1/2005 | Yano |
| 2006/0062452 | A1 | | 3/2006 | Utagawa |
| 2007/0097228 | A1 | | 5/2007 | Kuniba |

FOREIGN PATENT DOCUMENTS

| JP | A-02-143788 | 6/1990 |
| JP | A-04-315397 | 11/1992 |
| JP | A-06-090351 | 3/1994 |

(Continued)

OTHER PUBLICATIONS

Aug. 21, 2012 Office Action issued in Japanese Patent Application No. 2007-079157 (with English Translation).

(Continued)

*Primary Examiner* — Nelson D. Hernández Hernández
(74) *Attorney, Agent, or Firm* — Oliff & Berridge, PLC

(57) ABSTRACT

An image processing apparatus includes: a gradation conversion unit that executes gradation conversion processing based upon gradation conversion features assuming a slope that changes at a predetermined brightness level, on a component representing a brightness of an image in a color space expressed with the component representing the brightness and a component representing a color depth; and a modulation unit that executes modulation processing on the component representing the color depth by multiplying the component representing the color depth by modulation features, wherein: the modulation features are set so as to assume values equal to or less than 1 over at least part of a brightness range above the predetermined brightness level.

2 Claims, 15 Drawing Sheets

(56) References Cited

FOREIGN PATENT DOCUMENTS

| JP | A-06-181520 | 6/1994 |
| --- | --- | --- |
| JP | A-2000-032482 | 1/2000 |
| JP | A-2003-224860 | 8/2003 |
| JP | A-2003-235055 | 8/2003 |
| JP | A-2003-250058 | 9/2003 |
| JP | B2-3596387 | 12/2004 |
| JP | A-2005-064727 | 3/2005 |
| JP | A-2006-237657 | 9/2006 |

OTHER PUBLICATIONS

Nov. 13, 2012 Office Action issued in Japanese Application No. 2007-079157 (with translation).

* cited by examiner

7a

IMAGE PROCESSING APPARATUS HAVING A GRADATION CONVERSION UNIT THAT EXECUTES GRADATION CONVERSION PROCESSING, AND IMAGE PROCESSING METHOD FOR THE SAME

TECHNICAL FIELD

The present invention relates to an image processing apparatus engaged in image processing, an image processing method, an image processing computer program product used in image processing and a camera equipped with the image processing apparatus.

BACKGROUND ART

An input signal obtained via an image sensor is converted at an A/D converter to a digital signal assuming a value equal to or less than a predetermined level. However, when a very bright image is captured, gradations equal to or higher than the maximum level cannot be expressed and, accordingly, knee processing is executed to compress data assuming a given gradation level and higher so as to express the gradations within a range equal to or less than the specific value. For instance, the levels of the individual color signals among three primary color signals having been input may be determined, knee processing may be executed on two specific signals based upon the signal levels and a specific type of processing may be executed on the remaining signal based upon the signal values indicated by the other two signals before and after the knee processing (see patent reference 1). Patent reference 1: Patent Publication No. 3596387

DISCLOSURE OF THE INVENTION

Problems to be Solved by the Invention

There is an issue yet to be addressed in that while the technology described above preserves the initial hue, it univocally determines the color saturation at high brightness and thus affords little freedom with regard to the extent to which the color saturation may be compressed. As a result, the user cannot easily create an image with the exact color and hue he prefers.

Means for Solving the Problems

An image processing apparatus according to the 1st aspect of the present invention comprises: gradation conversion unit that executes gradation conversion processing based upon gradation conversion features assuming a slope that changes at a predetermined brightness level, on a component representing a brightness of an image in a color space expressed with the component representing the brightness and a component representing a color depth; and a modulation unit that executes modulation processing on the component representing the color depth by multiplying the component representing the color depth by modulation features, wherein: the modulation features are set so as to assume values equal to or less than 1 over at least part of a brightness range above the predetermined brightness level.

According to the 2nd aspect of the present invention, in the image processing apparatus according to the 1st aspect, the modulation features are set so that a slope thereof in the brightness range above the predetermined brightness level is smaller than the slope thereof assumed over a range darker than the predetermined brightness level.

According to the 3rd aspect of the present invention, in the image processing apparatus according to the 1st aspect, the component representing the color depth is a component representing a degree of color saturation in the image; and the modulation unit executes saturation modulation processing on the component representing the degree of color saturation in the image.

According to the 4th aspect of the present invention, in the image processing apparatus according to the 1st aspect, the component representing the color depth is a component representing a color difference in the image; and the modulation unit executes color difference modulation processing on the component representing the color difference in the image.

According to the 5th aspect of the present invention, in the image processing apparatus according to any one of 2nd through 4th aspects, the modulation features are set so that a predetermined value is output when an input value for the component representing the brightness indicates a level equal to or less than the predetermined brightness level and that an output value calculated based upon a decreasing function is output when the input value for the component representing the brightness indicates a level greater than the predetermined brightness level.

According to the 6th aspect of the present invention, in the image processing apparatus according to the 5th aspect, the decreasing function is a monotonously decreasing function.

An image processing method according to the 7th aspect of the present invention comprises: executing gradation conversion processing based upon gradation conversion features assuming a slope that changes at a predetermined brightness level, on a component representing a brightness of an image in a color space expressed with the component representing the brightness and a component representing a color depth; and executing modulation processing on the component representing the color depth component by multiplying the component representing the color depth by modulation features that assume values equal to or less than 1 over at least part of a brightness range above the predetermined brightness level.

According to the 8th aspect of the present invention, in the image processing method according to the 7th aspect, the modulation features are set so that a slope thereof in the brightness range above the predetermined brightness level is smaller than the slope thereof assumed over a range darker than the predetermined brightness level.

According to the 9th aspect of the present invention, in the image processing method according to the 7th aspect, the component representing the color depth component is a component representing a degree of color saturation in the image; and the modulation unit executes saturation modulation processing on the component representing the degree of color saturation in the image.

According to the 10th aspect of the present invention, in the image processing method according to the 7th aspect, the component representing the color depth component is a component representing a color difference in the image; and the modulation unit executes color difference modulation processing on the component representing the color difference in the image.

According to the 11th aspect of the present invention, in the image processing method according to any one of the 8th through 10th aspects, the modulation features are set so that a predetermined value is output when an input value for the component representing the brightness indicates a level equal to or less than the predetermined brightness level and that an output value calculated based upon a decreasing function is output when the input value for the component representing the brightness indicates a level greater than the predetermined level.

According to the 12th aspect of the present invention, in the image processing method according to the 11th aspect, the decreasing function is a monotonously decreasing function.

An image processing computer program product according to the 13th aspect of the present invention, has stored therein an image processing program that enables a computer to execute an image processing method according to any one of the 7th through 12th aspects.

A camera according to the 14th aspect of the present invention comprises: an image acquisition unit that acquires an image through imaging operation; and an image processing apparatus according to any one of claims 1 through 6, wherein: the gradation conversion unit executes the gradation conversion processing on a component representing a brightness at each of pixels expressing the image acquired via the image acquisition unit; and the modulation unit executes modulation processing on a component representing a color depth at each of the pixels expressing the image acquired via the image acquisition unit.

Effect of the Invention

The present invention allows the user to create an image composed exactly as he wishes.

BEST MODE FOR CARRYING OUT THE INVENTION

First Embodiment

Figure 1:
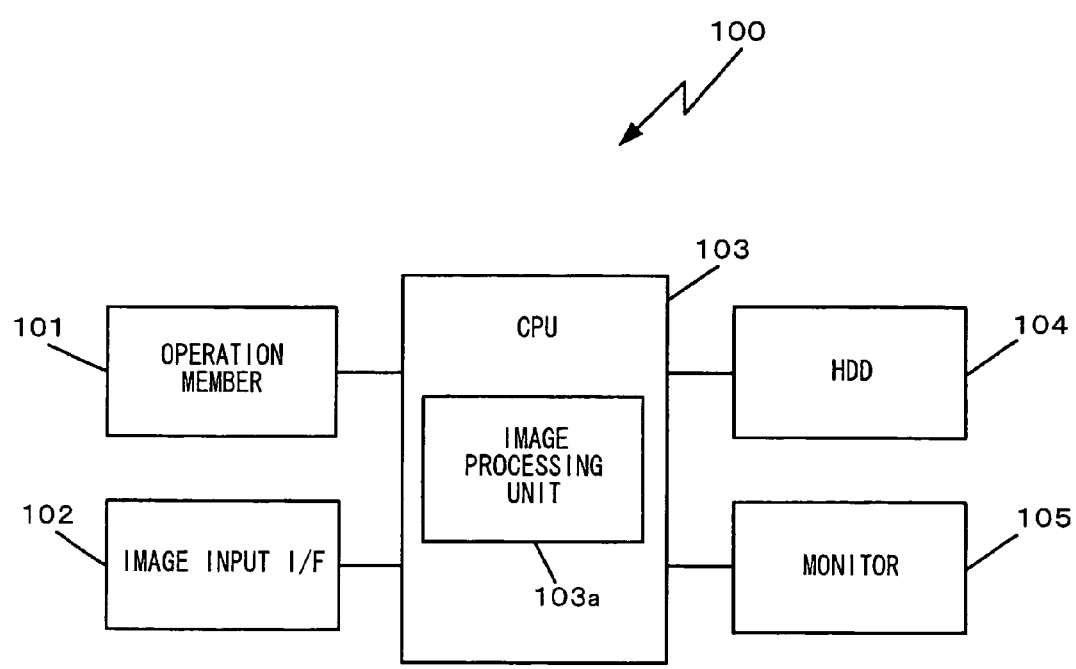
FIG. 1 A block diagram showing the structure adopted in the image processing apparatus achieved in an embodiment FIG. 2 A schematic diagram indicating the flow of the processing executed by the image processing unit 103a in a first embodiment FIG. 3 A specific example showing how the CbCr plane may be divided into six areas in the first embodiment FIG. 4 A specific example of HSV representation achieved in the YCbCr space FIG. 5 A specific example of the color gamut in the HSV color space FIG. 6 A specific example of the color gamut in the YCbCr color space FIG. 7 A specific example of gradation conversion features based upon which the gradation conversion processing 2b may be executed FIG. 8 A specific example of gain based upon which the color saturation modulation processing 2c may be executed FIG. 9 A schematic diagram indicating the flow of the processing executed by the image processing unit 103a in a second embodiment FIG. 10 A specific example showing how the CbCr plane may be divided into three areas in the second embodiment FIG. 11 A specific example of gradation conversion features based upon which the gradation conversion processing 9b may be executed FIG. 12 A specific example of gain based upon which the color difference modulation processing 9c may be executed FIG. 13 A schematic diagram of the flow of processing executed by the image processing unit 103a to output image data in the YCbCr color space FIG. 14 A schematic diagram of the flow of processing executed by the image processing unit 103a in a camera adopting the image processing apparatus FIG. 15 An illustration showing how the program may be provided to a personal computer

FIG. 1 is a block diagram showing the structure that the image processing apparatus in the first embodiment may assume. The image processing apparatus 100, which may be a personal computer, includes an operation member 101, an input I/F (interface) 102, a control device 103, an HDD (hard disk drive) 104 and a monitor 105.

The operation member 101 includes various devices operated by the user such as a keyboard and a mouse. The image input I/F 102, via which image data originating from an imaging apparatus such as a digital camera are taken in, may be, for instance, a USB interface that enables wired connection with a digital camera or a wireless LAN module that enables wireless connection with the digital camera.

The control device 103, constituted with a CPU, a memory and other peripheral circuits, executes overall control for the image processing apparatus 100 as it executes various programs read from the HDD 104. It is to be noted that the processing executed by the control device 103 is to be described in detail later.

The HDD 104 is a recording device at which the image data taken in via the image input I/F 102, the various programs executed by the control device 103 and the like are recorded. At the monitor 105, which may be, for instance, an LCD monitor or a liquid crystal monitor, display data output from the control device 103 are displayed.

The image processing apparatus 100 achieved in the embodiment executes gradation conversion processing and modulation processing corresponding to the gradation conversion processing on an image having been taken in via the image input I/F 102 and then records the processed image into the HDD 104. The control device 103 includes a functional unit, i.e., an image processing unit 103a in the description, engaged in such processing. The processing executed by the image processing unit 103a is now described. It is to be noted that the following description is given by assuming that the image data taken in via the image input I/F 102 are expressed in the RGB colorimetric system (primary color representation). In other words, it is assumed that RGB signals are input to the image processing unit 103a.

Figure 2:
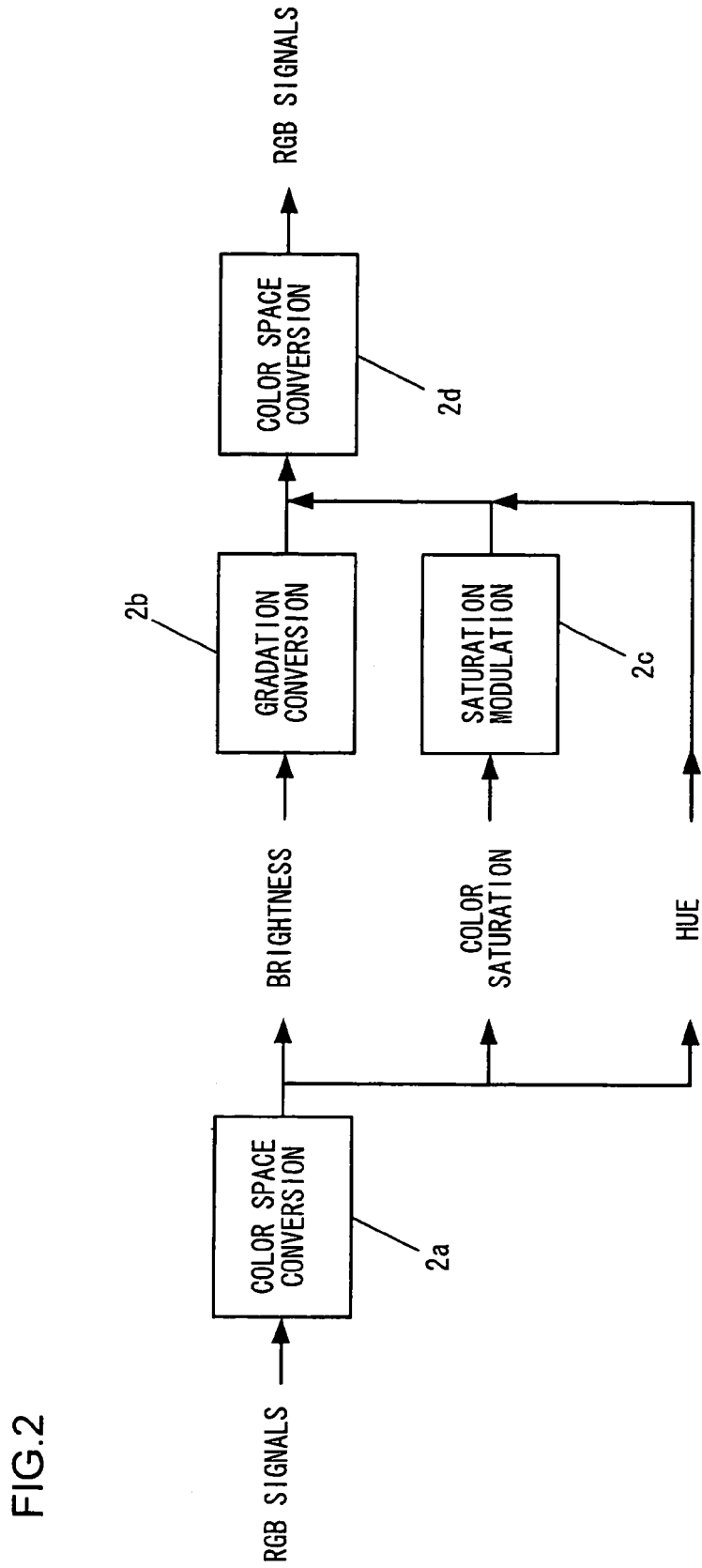

FIG. 2 is a schematic diagram of the flow of the processing executed by the image processing unit 103a. As shown in FIG. 2, the image processing unit 103a executes color space conversion processing 2a on the RGB signals (input RGB signals) input thereto, so as to convert the data in the RGB color space to data in an HSV color space expressed by a brightness component V representing the brightness of the image, a color saturation component S representing the depth of color and a hue component H. Then, it executes gradation conversion processing 2b on the brightness component V and executes color saturation modulation processing 2c on the color saturation component S in correspondence to the brightness V. Subsequently, it executes color space conversion processing 2d so as to convert the data in the HSV color space back to data in the RGB color space and outputs the RGB signals resulting from the conversion.

It is to be noted that the image processing unit 103a executes the color space conversion processing 2a, the gradation conversion processing 2b, the color saturation modulation processing 2c and the color space conversion processing 2d individually based upon programs read out from the HDD 104 where the programs are recorded. The following is a description of the individual phases 2a~2d of the image processing.

(A) Color Space Conversion 2a

The image processing unit 103a executes the color space conversion processing 2a by first converting the input RGB signal to YCbCr signal, as expressed in (1) below. It is to be noted that M in expression (1) represents the conversion matrix which may be expressed as in (2) below.

$$\begin{pmatrix} Y \\ C_B \\ C_R \end{pmatrix} = M \cdot \begin{pmatrix} R \\ G \\ B \end{pmatrix} \quad (1)$$

$$M = \begin{pmatrix} 0.2990 & 0.5870 & 0.1140 \\ -0.1687 & -0.3313 & 0.5000 \\ 0.5000 & -0.4187 & -0.0813 \end{pmatrix} \quad (2)$$

Figure 3:
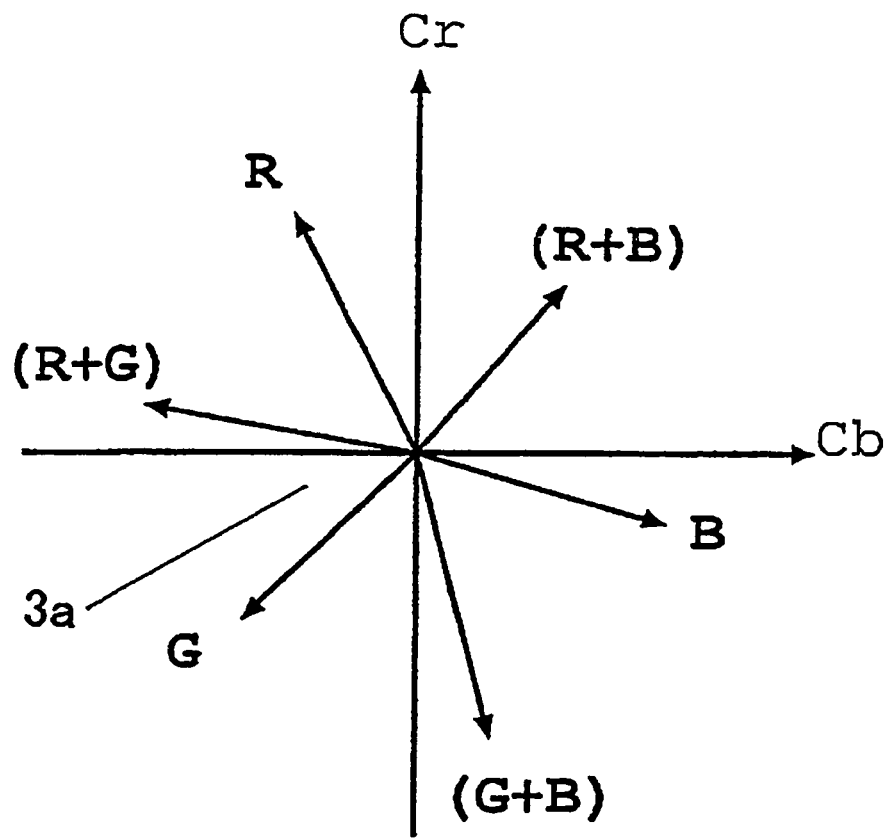

Next, the image processing unit 103a divides the CbCr plane into six separate areas defined by R, G, B, R+G, R+B and G+B vectors, as shown in FIG. 3. Then, a color coordinate x indicated with the YCbCr signal is converted so as to assume base vectors a, b and c in each area and x is thus expressed as in (3) below.

$$x = ka + lb + mc \quad (3)$$

For instance, in an area 3a enclosed by the vector R+G and the vector G, x is expressed as in (4) below by using Y, (R+G) and G.

$$x = k \cdot Y + l \cdot (R+G) + m \cdot G \quad (4)$$

It is to be noted that k, l and m in expressions (3) and (4) can be determined as expressed below in coordinate conversion expression (5).

$$\begin{pmatrix} a^2 & a \cdot c \\ a \cdot b & b^2 & b \cdot c \\ a \cdot c & b \cdot c & c^2 \end{pmatrix} \begin{pmatrix} k \\ l \\ m \end{pmatrix} = \begin{pmatrix} a \cdot x \\ b \cdot x \\ c \cdot x \end{pmatrix} \quad (5)$$

Figure 4:
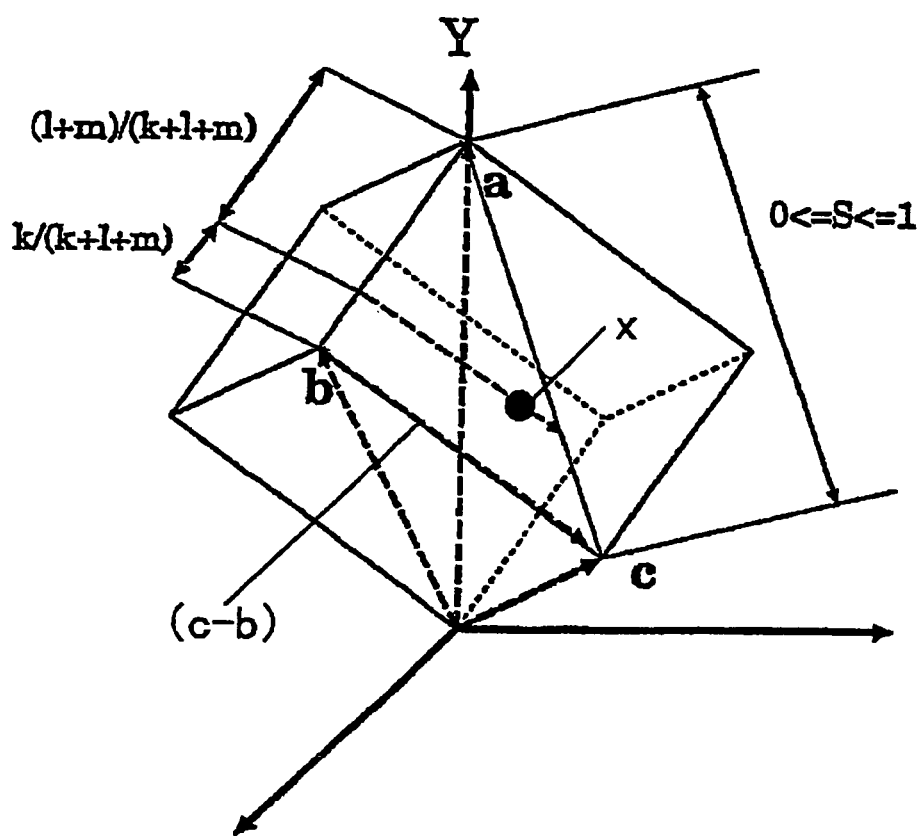

In addition, since the HSV representation may be achieved as shown in FIG. 4 in the YCbCr space, H, S and V may be respectively calculated as expressed in (6)~(8) below.

$$H = \frac{1}{6}\left(\frac{m}{l+m} + h_{offset}\right) \quad (6)$$

$$S = \frac{l+m}{k+l+m} \quad (7)$$

$$V = k + l + m \quad (8)$$

It is to be noted that $h_{offset}$ in expression (6) represents a constant determined in correspondence to each area defined by specific vectors as shown in FIG. 3. For instance, $h_{offset}=0$ for the area defined by the vector R and the vector R+G, whereas $h_{offset}=1$ for the area defined by the vector R+G and the vector G. Also, $h_{offset}=2$ for the area defined by the vector G and the vector G+B, whereas $h_{offset}=3$ for the area defined by the vector G+B and the vector B. Moreover, $h_{offset}=4$ for the area defined by the vector B and the vector R+B, whereas $h_{offset}=5$ for the area defined by the vector R+B and the vector R.

Figure 5:
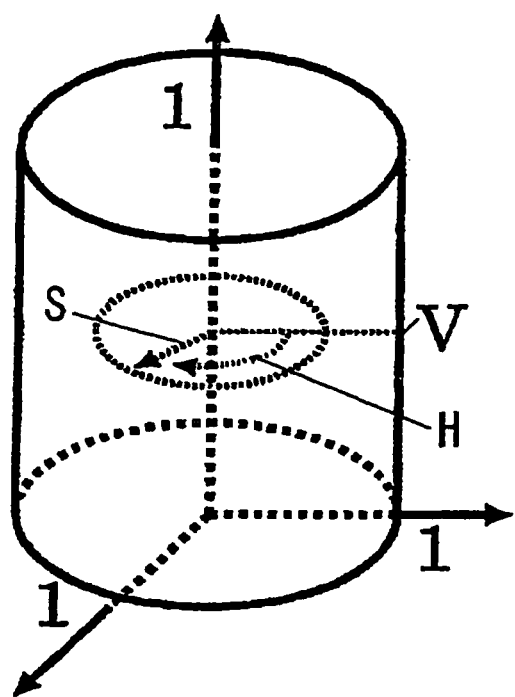
Figure 6:
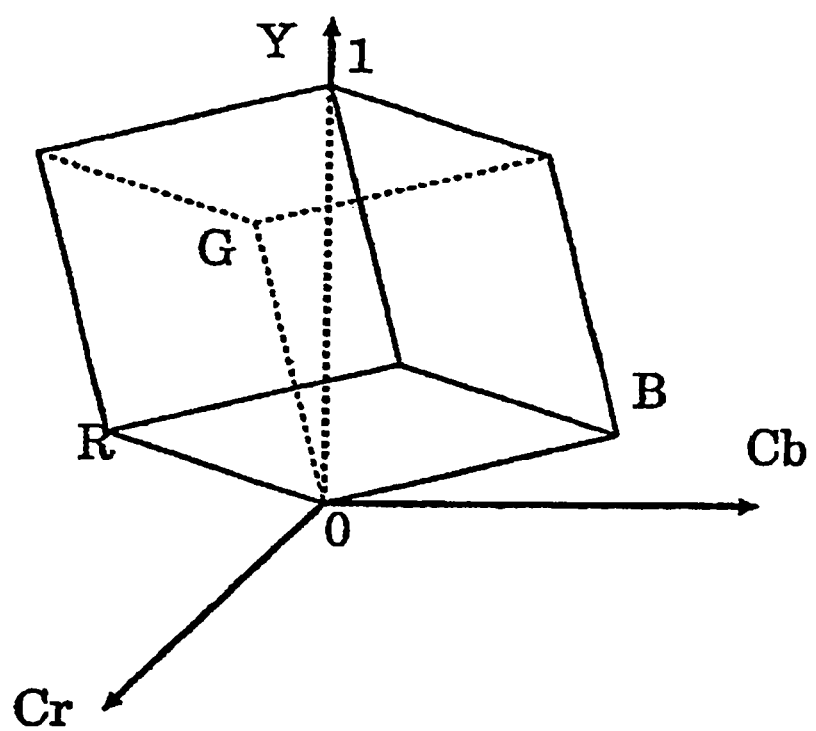

Through this process, color space conversion from the RGB color space to the HSV color space is executed. It is to be noted that the color space is converted from the RGB color space to the HSV color space, since the HSV color space assumes a color gamut indicated as in FIG. 5 and the upper limit of the color gamut can be judged simply in correspondence to the brightness V. In the YCbCr color space, the upper limit of the color gamut cannot be determined based upon the brightness Y alone, as shown in FIG. 6, presenting difficulty in compressing the data with high brightness to reliably fit them within the color gamut.

(B) Gradation Conversion Processing 2b

The image processing unit 103a executes the gradation conversion processing 2b by setting a knee point (change point) for the input dynamic range and thus determining a specific relationship between the input brightness Vin and the output brightness Vout as expressed in (9) below.

$$Vout = f(Vin) \quad (9)$$

Figure 7:
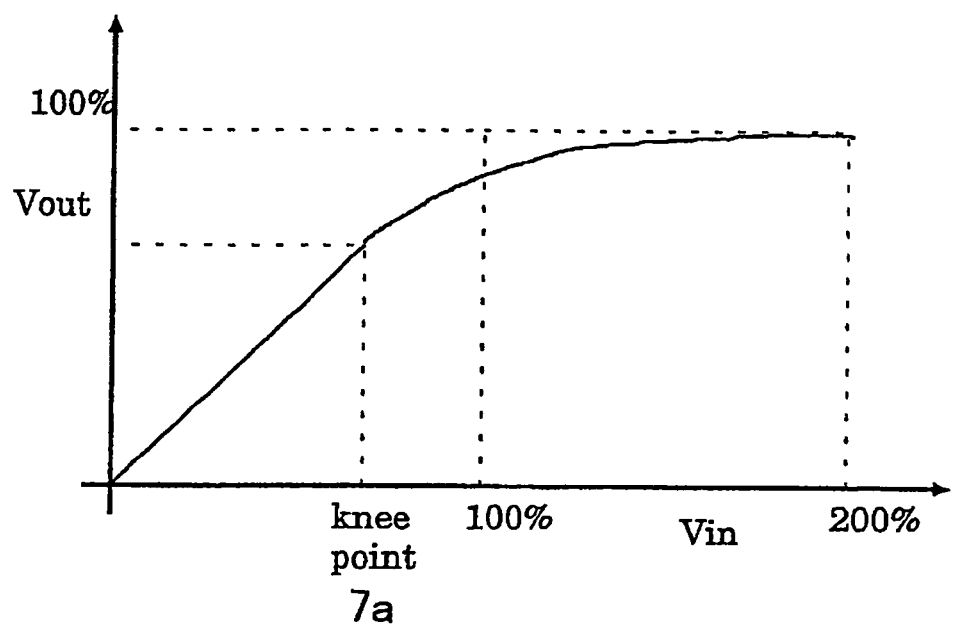

For instance, when executing gradation conversion for image data having been obtained through photographing operation executed in a 200% dynamic range, the input brightness Vin is multiplied by gradation conversion features, the slope of which changes at a knee point 7a, as shown in FIG. 7. In other words, the gradation conversion processing is executed based upon the gradation conversion features, the slope of which changes at a specific brightness level and thus, the high brightness data, with a brightness level equal to or above the knee point 7a, are compressed so that all the data fit within a dynamic range of 100%. Consequently, the output brightness Vout, adjusted so as to reliably fit within the color gamut through compression of the input brightness Vin, is obtained.

(C) Color Saturation Modulation Processing 2c

If the saturation of the image is left as is after the brightness V of the image data is compressed so as to fit within the 100% color gamut through the gradation conversion processing 2b described above, natural-looking highlights cannot be achieved. Accordingly, the image processing unit 103a compresses the color saturation S of the high brightness data by executing color saturation modulation processing 2c. More specifically, the image processing unit 103a multiplies the input color saturation Sin by a gain g (modulation features) corresponding to the input brightness Vin so as to calculate a modulated output color saturation Sout as expressed in (10) below.

$$Sout = g(Vin) \cdot Sin \quad (10)$$

Figure 8:
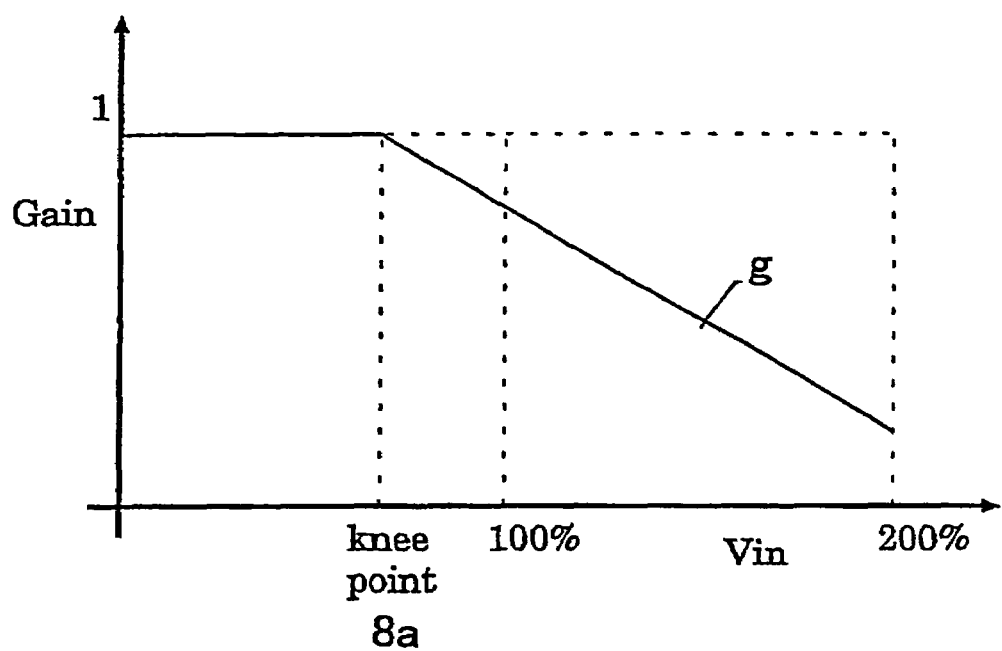

For instance, the output color saturation Sout may be determined by setting the gain g as shown in FIG. 8 in correspondence to the input brightness Vin at the same pixel and multiplying the input color saturation Sin by the gain g. As shown in FIG. 8, the slope of the gain g over the range where the input brightness Vin is higher than the knee point 7a, set for the gradation conversion features, as shown in FIG. 7, is shallower than the slope of the gain over the range where the input brightness is lower than the knee point 7a. In addition, the gain g assumes values smaller than 1 over the range where the input brightness is higher than the knee point 7a. Through these measures, a visual impression that is identical to that resulting from naked-eye observation is created with regard to the change in the light level and the change in the color saturation level at a luminous pixel. In addition, by setting a knee point 8a at which the slope of the gain g changes so as to match the knee point 7a of the gradation conversion features, a natural change in the color saturation can be expressed.

It is to be noted that the gain g is set so that an output value of 1 is assumed when the input brightness Vin is equal to or lower than the knee point 8*a* and the output value monotonously decreases as the input brightness Vin becomes higher than the knee point 8*a*. As an alternative, in the range over which the gain g monotonously decreases, the gain g may be set so that it decreases based upon a specific decreasing function instead of decreasing monotonously. A fixed parameter or a variable parameter may be used to determine the decreasing function, and the user may be allowed to set any parameter as a variable parameter.

(D) Color Space Conversion Processing 2*d*

The color space conversion processing 2*d* is executed as the image processing unit 103*a* converts the color space from the HSV color space to the RGB color space. The data in the HSV color space can be converted to data in the RGB color space through a calculation executed with regard to the hue H in correspondence to each of the six divided areas. Namely, R, G and B values can be individually calculated as expressed in (11)~(16) below.

$$\text{if } 0 \le H < 1/6, \quad (11)$$
$$\begin{cases} R = V \\ B = V(1-S) \\ G = V - (1-6H)(V-B) \end{cases}$$

$$\text{if } 1/6 \le H < 2/6, \quad (12)$$
$$\begin{cases} G = V \\ B = V(1-S) \\ R = G - (6H-1)(G-B) \end{cases}$$

$$\text{if } 2/6 \le H < 3/6, \quad (13)$$
$$\begin{cases} G = V \\ R = V(1-S) \\ B = G - (3-6H)(G-R) \end{cases}$$

$$\text{if } 3/6 \le H < 4/6, \quad (14)$$
$$\begin{cases} B = V \\ R = V(1-S) \\ G = B - (6H-3)(B-R) \end{cases}$$

$$\text{if } 4/6 \le H < 5/6, \quad (15)$$
$$\begin{cases} B = V \\ G = V(1-S) \\ R = B - (5-6H)(B-G) \end{cases}$$

$$\text{if } 5/6 \le H \le 1, \quad (16)$$
$$\begin{cases} R = V \\ G = V(1-S) \\ B = R - (6H-5)(R-G) \end{cases}$$

The image processing unit 103*a* outputs the image data having undergone the image processing through the processing procedure described above as output image data. For instance, the image processing unit 103*a* may output the output image data to the HDD 104 so as to record the image data resulting from the image processing. In addition, the image processing unit 103*a* may output the output image data to the monitor 105 so as to bring up the image resulting from the image processing on display.

The following advantages are achieved through the first embodiment described above.

(1) Gradation conversion processing is executed on an image in the HSV color space expressed with the brightness component V representing the brightness of the image, the saturation component S representing the depth of the color of the image and the hue component H by multiplying the brightness V by the gradation conversion features, the slope of which changes at a specific knee point. In addition, modulation processing is executed by multiplying the saturation S by the gain g, the slope of which changes at the same knee point as the knee point of the gradation conversion features. As a result, the saturation can be modulated in correspondence to the gradation conversion, making it possible to obtain a natural-looking image.

(2) The gain g is set so that a specific value of, for instance, 1 is invariably output when the value input for the brightness V is equal to or less than the knee point and that a value calculated based upon a decreasing function, e.g., a monotonously decreasing function, is output when the value input for the brightness V indicates a level higher than the knee point. Consequently, the color saturation S can be modulated without inducing over-saturation.

Second Embodiment

In the first embodiment described above, the input RGB signals undergo color space conversion to be converted to data expressed in the HSV color space, the brightness V component in the HSV color space undergoes gradation conversion processing and the color saturation component S in the HSV color space undergoes color saturation modulation processing executed in coordination with the gradation conversion. Then, the data in the HSV color are converted to data in the RGB color space so as to obtain RGB signals resulting from the image processing.

In the second embodiment, the input RGB signals undergo color space conversion to convert the RGB signals to data in a VCbCr color space expressed with a brightness component V representing the brightness of the image and color difference components CbCr representing the depth of the color of the image. Then, the brightness component V in the VCbCr color space undergoes gradation conversion processing and color difference modulation processing is executed on the color differences Cb and Cr in correspondence to the gradation conversion. Subsequently, the data in the VCbCr color space are converted to data in the RGB color space so as to obtain RGB signals resulting from the image processing. It is to be noted that the image processing apparatus in the second embodiment is identical to the image processing apparatus 100 having the configuration shown in the block diagram in FIG. 1 in reference to which the first embodiment has been described and accordingly, a repeated explanation is not provided.

Figure 9:
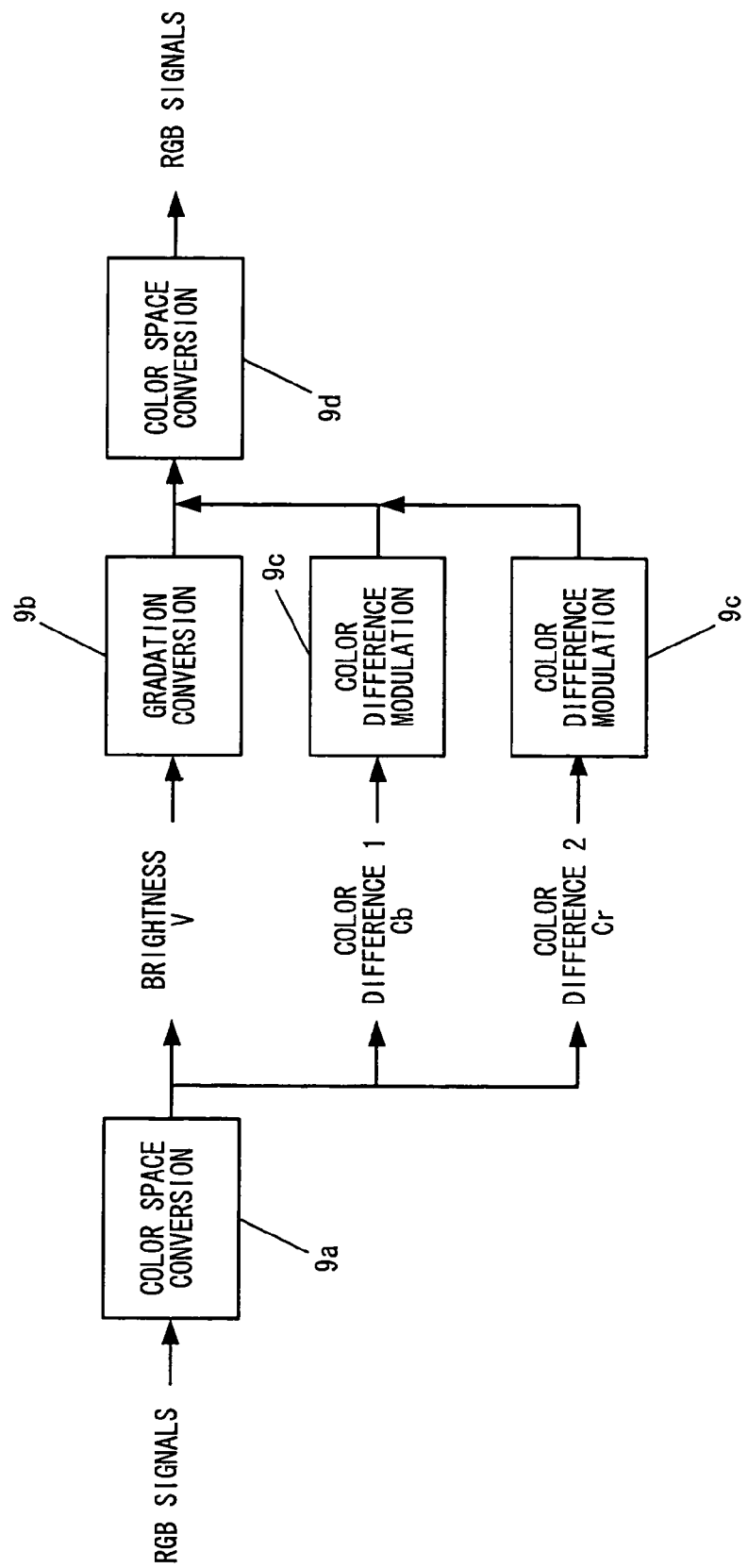

FIG. 9 is a schematic block diagram of the flow of the processing executed by the image processing unit 103*a*. As shown in FIG. 9, the image processing unit 103*a* executes color space conversion processing 9*a* on the RGB signals (input RGB signals) input thereto, so as to convert the data in the RGB color space to data in the VCbCr color space expressed by a brightness component V, and color difference components Cb and Cr. Then, it executes gradation conversion processing 9*b* on the brightness component V and executes color difference modulation processing 9*c* on the color difference components Cb and Cr in correspondence to the brightness V. Subsequently, it executes color space conversion processing 9*d* so as to convert the data in the VCbCr color space back to data in the RGB color space and outputs the RGB signals resulting from the conversion.

It is to be noted that the image processing unit 103*a* executes the color space conversion processing 9*a*, the gradation conversion processing 9b, the color difference modulation processing 9c and the color space conversion processing 9d individually based upon programs read out from the HDD 104 where the programs are recorded. The following is a description of the individual phases 9a~9d of the image processing.

(A) Color Space Conversion Processing 9a

Figure 10:
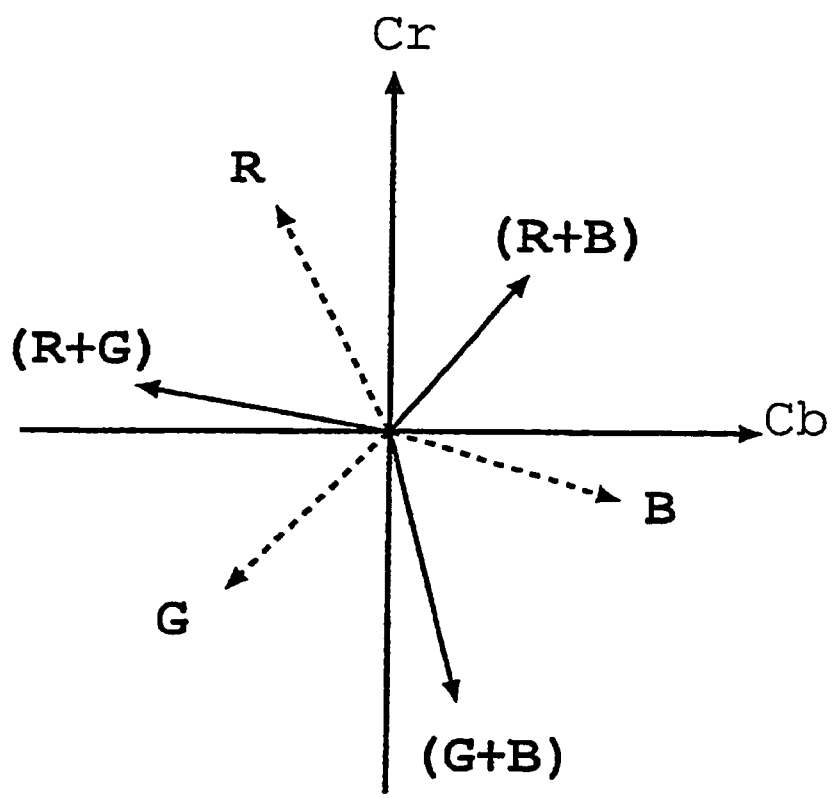

As in the first embodiment, the image processing unit 103a executes the color space conversion processing 9a by first converting the input RGB signals to YCbCr signals as expressed in (1). It then divides the CbCr plane into a plurality of areas. It is to be noted that the CbCr plane is divided into six areas as shown in FIG. 3 in the first embodiment in order to convert the data in the YCbCr color space to data in the HSV color space. However, only the brightness V needs to be calculated in the second embodiment, in which the data in the YCbCr color space are converted to data in the VCbCr color space. For this reason, since only the brightness V needs to be determined through calculation, the CbCr plane simply needs to be divided into three areas defined with three vectors, i.e., the vector R+G, the vector R+B and the vector G+B, as shown in FIG. 10.

Namely, the brightness V can be calculated as V=k+l+m shown in expression (8) only three different ways. More specifically, assuming that the conversion matrix M expressed in (2) has been used to convert the RGB signals to YCbCr signals, the brightness V can be calculated as expressed in (17)~(19) below.

For the area enclosed by the vector R+B and the vector R+G $$V=Y-0.0002Cb+1.4023Cr \qquad (17)$$

For the area enclosed by the vector R+G and the vector G+B $$V=Y-0.3441Cb-0.7141Cr \qquad (18)$$

For the area enclosed by the vector R+B and the vector G+B $$V=Y+1.7720Cr-0.0001Cr \qquad (19)$$

(B) Gradation Conversion Processing 9b

The image processing unit 103a executes the gradation conversion processing 9b on the brightness component V in the VCbCr color space resulting from the color space conversion processing 9a. The brightness data expressed with 12-bit data assume values within a range of 0~4095. Accordingly, the data, having been obtained by assuming the 100% dynamic range equal to, for instance, 1900, undergo gradation conversion based upon specific gradation features such as those shown in FIG. 11 so as to adjust the 100% dynamic range to 4095. It is to be noted that in the gradation conversion features shown in FIG. 11, the brightness knee point is set to 1000 and that the gradation conversion features are represented by a straight line with a slope of 4095/1900 over the brightness range of 0≤V≤1000.

(C) Color Difference Modulation Processing 9c

Following the gradation conversion processing 9b executed as described above on the brightness V, the color depth may be changed if the color differences Cb and Cr are not converted in correspondence to the brightness component V having undergone the gradation conversion. Accordingly, the image processing unit 103a multiplies the individual color differences Cb and Cr by a gain matching the brightness change rate so as to sustain the color depth. For instance, the image processing unit 103a may multiply the color differences Cb and Cr by the gain g' assuming the features shown in FIG. 12 so as to reduce the color depth and assume a paler color over a high brightness area for a more natural highlight expression.

Figure 11:
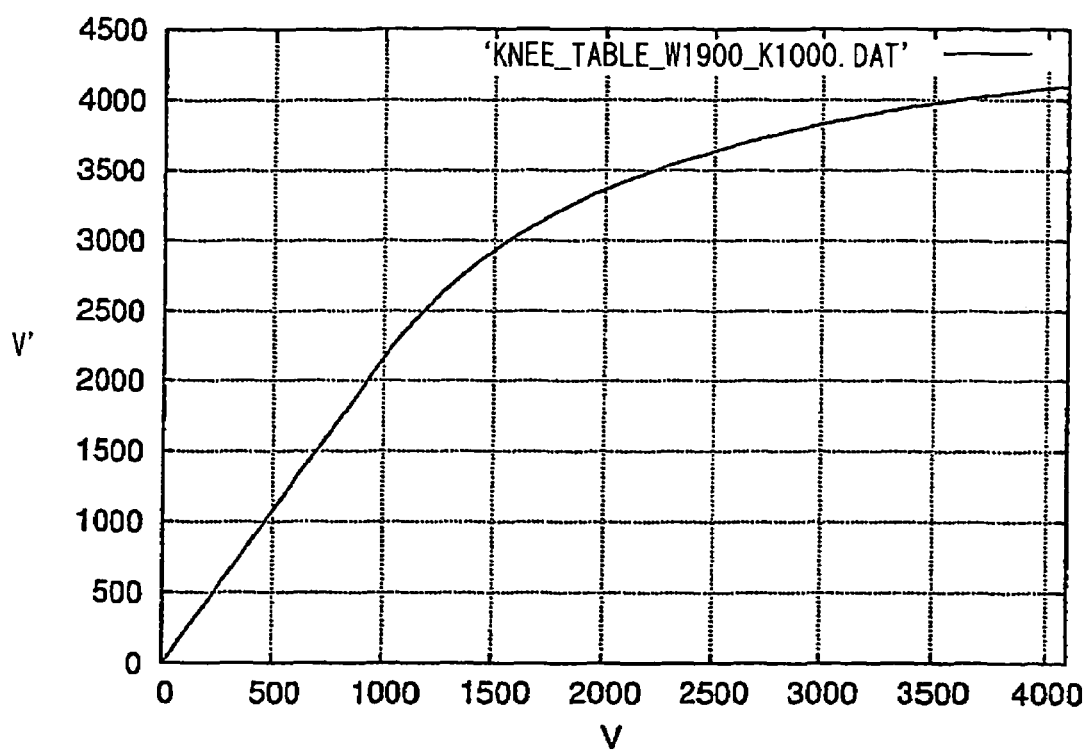
Figure 12:
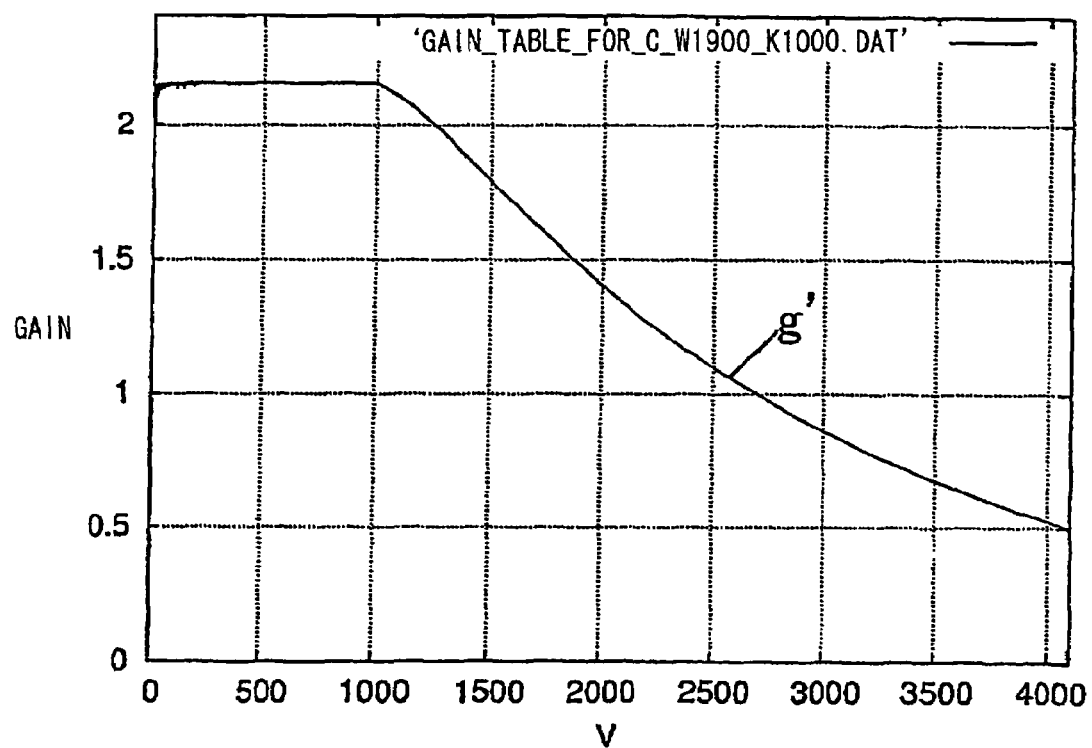
Figure 13:
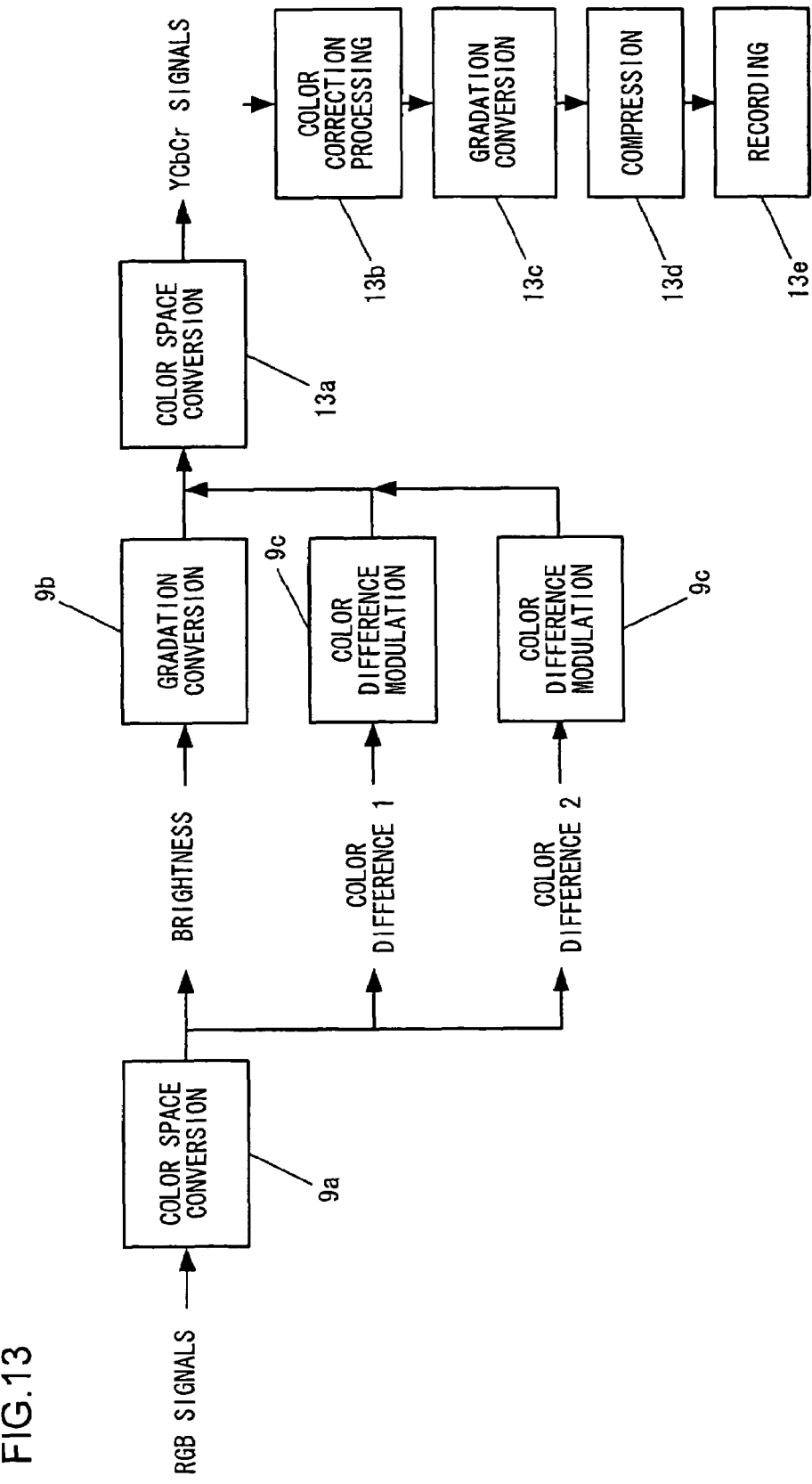

As for the gradation conversion features shown in FIG. 11, the brightness knee point is set to 1000 for the gain g' in FIG. 12 so as to sustain a constant color depth level at or below the knee point and allow the color to become gradually paler as the brightness exceeds the knee point by a greater extent. In more specific terms, the gain g' is set so that an output value is assumed the change ratio of the brightness when the input brightness Vin is equal to or lower than the knee point (1000) and the output value monotonously decreases as the input brightness Vin becomes higher than the knee point.

It is to be noted that as an alternative, in the range over which the gain g' monotonously decreases, the gain g' may be set so that the output value decreases based upon a specific decreasing function instead of decreasing monotonously. A fixed parameter or a variable parameter may be used to determine the decreasing function, and the user may be allowed to set any parameter as a variable parameter.

(D) Color Space Conversion Processing 9d

In the color space conversion processing 9d, the image processing unit 103a executes reverse conversion by reversing the process of the conversion expressed in (17)~(19) so as to convert the data in the VCbCr color space to data in the YCbCr color space. Namely, the brightness Y in the YCbCr color space is calculated as expressed in (20)~(22) below.

For the area enclosed by the vector R+B and the vector R+G $$Y=V+0.0002Cb-1.4023Cr \qquad (20)$$

For the area enclosed by the vector R+G and the vector G+B $$Y=V+0.3441Cb+0.7141Cr \qquad (21)$$

For the area enclosed by the vector R+B and the vector G+B $$Y=V-1.7720Cb+0.0001Cr \qquad (22)$$

The image processing unit 103a further executes reverse conversion by reversing the process of the conversion expressed in (1) so as to convert the data in the YCbCr color space to data in the RGB color space. Namely, the data in the YCbCr color space are converted to those in the RGB color space as expressed in (23) below.

$$\begin{pmatrix} R \\ G \\ B \end{pmatrix} = M^{-1} \cdot \begin{pmatrix} Y \\ C_B \\ C_R \end{pmatrix} \qquad (23)$$

The image processing unit 103a outputs the image data having undergone the image processing through the processing procedure described above as output image data. The image processing unit 103a may output the output image data to, for instance, the HDD 104 so as to record the image data resulting from the image processing. In addition, the image processing unit 103a may output the output image data to the monitor 105 so as to bring up the image resulting from the image processing on display.

In addition to the advantages of the first embodiment, the following advantage is achieved through the second embodiment described above. Namely, gradation conversion processing is executed on an image in the VCbCr color space expressed with the brightness component V representing the brightness of the image, the color difference components Cb and Cr representing the depth of the color in the image by multiplying the brightness V by the gradation conversion features, the slope of which changes at a specific knee point. In addition, modulation processing is executed by multiplying the color difference components Cb and Cr by the gain g'. The slope of the gain g' changes at the same knee point as the knee point of the gradation conversion features. As a result, the color differences can be modulated in correspondence to the gradation conversion, making it possible to obtain a natural-looking image.

—Variations—

It is to be noted that the image processing apparatus achieved in the embodiments described above allows for the following variations.

(1) In the second embodiment, the image processing unit 103a first converts the input RGB signal to the YCbCr colorimetric system, then converts the YCbCr to VCbCr and subsequently executes the gradation conversion processing on the brightness V and the color difference modulation processing on the color differences Cb and Cr. Upon completing the processing, the data in the VCbCr colorimetric system are converted to data in the YCbCr colorimetric system, the data are further converted into the RGB colorimetric system for output. As an alternative, upon completing the gradation conversion processing and the color difference modulation processing, the image processing unit 103a may simply convert the data in the VCbCr colorimetric system into the YCbCr colorimetric system and output the image data in the YCbCr color space.

For instance, the image processing unit 103a may execute color space conversion processing 13a following individual phases of processing 9a~9c having been executed as in the second embodiment so as to convert from the VCbCr calorimetric system to the YCbCr colorimetric system and then output YCbCr signals as output signals. Subsequently, the image processing unit 103a may execute various types of processing such as color correction processing 13b, gradation conversion processing 13c and compression processing 13d of the known art on the image data in the YCbCr color space and record the compressed image data into the HDD 104 through recording processing 13e.

(2) The image processing apparatus 100 is constituted with a personal computer in the first and second embodiments described above. Instead, the present invention may be adopted in a digital camera. Namely, the processing executed by the image processing unit 103a may instead be executed in a control device, e.g., a CPU, in a digital camera so as to enable the image processing having been described in reference to the first embodiment and the second embodiment to be executed on image data obtained through photographing operation executed in the digital camera.

Figure 14:
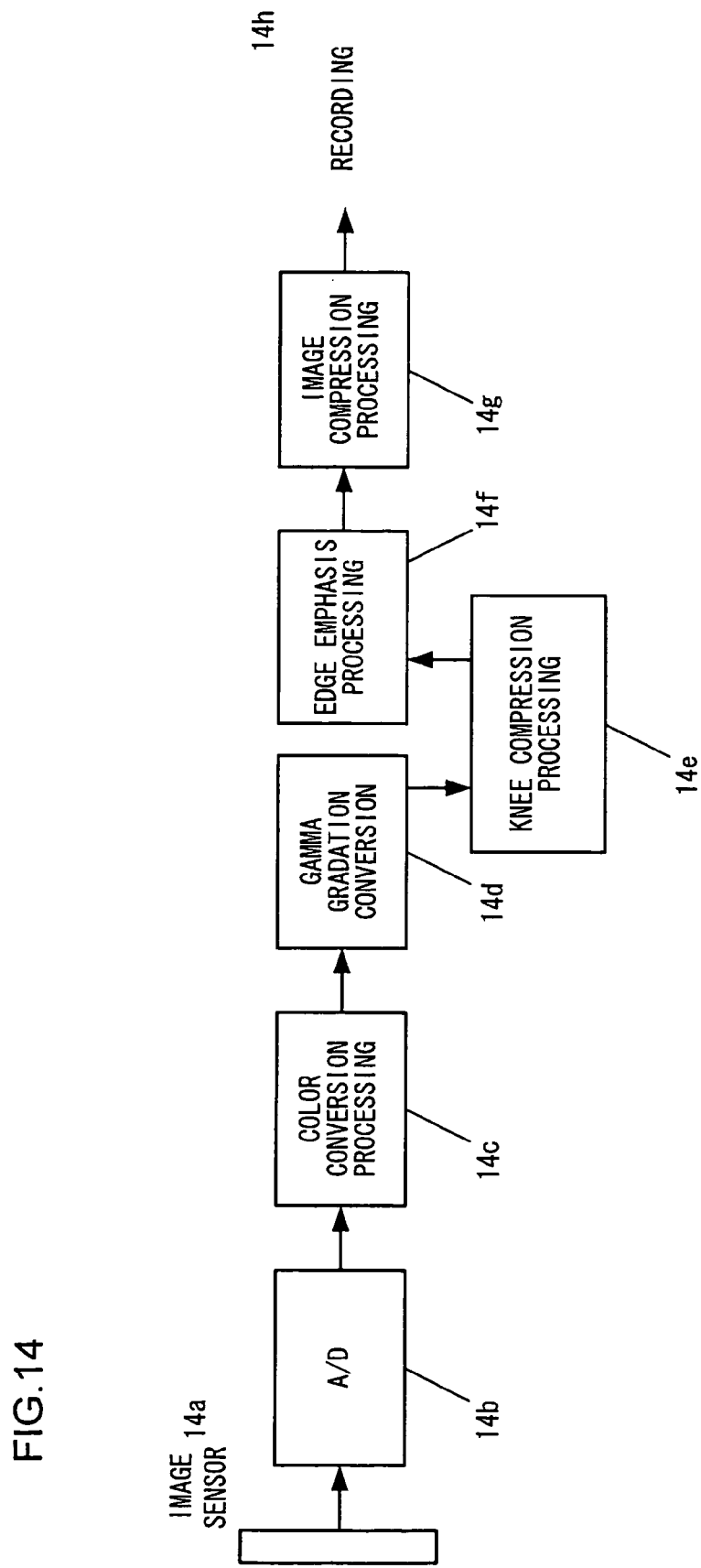

For instance, the flow of the processing executed in the digital camera, starting with the acquisition of an image and ending with image recording may be as shown in FIG. 14. In this case, A/D conversion 14b is executed on image data (RGB signals) input from an image sensor 14a. Subsequently, color conversion processing 14c and gamma gradation conversion processing 14d are executed, and then knee compression processing 14e is executed. The image data having undergone the knee compression processing 14e next undergo edge emphasis processing 14f and image compression processing 14g, and the image data are finally recorded (14h) into a recording medium such as a memory card.

In the processing executed as shown in FIG. 14, the control device obtains signals in a dynamic range equivalent to approximately 200% or more are obtained by selecting specific exposure conditions setting for the photographing operation and executes the knee compression processing 14e after executing the color conversion processing 14c and the gamma gradation conversion processing 14d in order to substantially sustain the dynamic range. In the knee compression processing 14e, the brightness V and the color differences Cb and Cr are calculated and knee compression processing is executed for the brightness component V in highlighted portions.

(3) In the second embodiment described earlier, the input RGB signals are converted to YCbCr signals and then the YCbCr signals are converted to image data in the VCbCr color space expressed with brightness and color differences.

Subsequently, gradation conversion processing is executed on the brightness component V and color difference modulation processing is executed on the color difference components Cb and Cr. As an alternative, the image signals may be converted to image data in a color space expressed with brightness and color difference other than the VCbCr color space. For instance, the input RGB signals may first be converted to YIQ signals, then the YIQ signals may be converted to data in a VIQ color space and the image data resulting from the conversion may undergo the processing.

(4) In the first embodiment, color saturation modulation is executed in the color saturation modulation processing 2c by multiplying the input color saturation S by the gain g. In the second embodiment, color difference modulation is executed in the color difference modulation processing 9c by multiplying the color differences Cb and Cr individually by the gain g'. The gain g or g' used in the processing is set so as to decrease based upon a specific decreasing function over the brightness range above the knee point and the parameter used to determine the decreasing function may be either a fixed parameter or a variable parameter. Instead, the parameter based upon which the decreasing function is determined may be set in correspondence to the scene mode set in the camera when photographing the image.

For instance, when the main subject in the photographic image is a person, e.g., in a portrait mode selected as the photographic scene mode, the subject can be made to stand out against a pale-colored background. Accordingly, the parameter should be set so that the decreasing function assumes a steep slope. In contrast, if the photographic scene mode selected in the camera is the landscape mode, the parameter should be set so that the decreasing function assumes a gentle slope in order to prevent the overall image from taking on a washed-out appearance.

In addition, while the gain g or g' assumes a value equal to or less than 1 over the brightness range above the knee point in the description provided above, the gain may assume a value equal to or less than 1 only over part of the brightness range above the knee point. In other words, the range over which the gain assumes a value equal to or less than 1 should be set in correspondence to the desired image expression to be achieved. For instance, if the image structure over a bright image area needs to be preserved, the cutoff brightness level at which the slope of the gain g or g' is to change may be set to a higher brightness level. It is to be noted that more natural color expression is normally achieved when the gain assumes values far smaller than 1 for brighter pixels.

Figure 15:
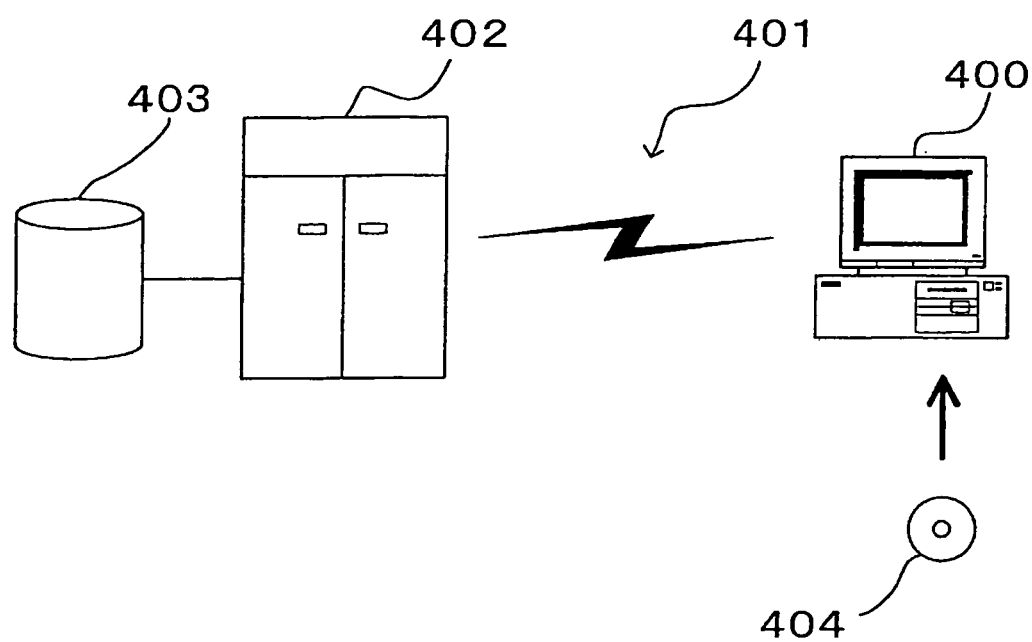

In addition, the image processing programs mentioned earlier enabling a personal computer or the like to execute the processing described above, may be provided in a recording medium such as a CD-ROM or though data signals carried on, for instance, the Internet. FIG. 15 shows how the programs may be actually provided. A personal computer 400 receives the programs via a CD ROM 404. The personal computer 400 is capable of connecting with a communication line 401. A computer 402 is a server computer that provides the programs stored in a recording medium such as a hard disk 403. The communication line 401 may be a communication network such as the Internet or a personal computer communication network, or it may be a dedicated communication line. The computer 402 reads out the programs from the hard disk 403 and transmits the programs to the personal computer 400 via the communication line 401. Namely, the programs, embodied as data signals on a carrier wave, are transmitted via the communication line 401. In other words, the programs may be distributed as a computer-readable computer program product adopting any of various modes including a recording medium and a carrier wave.

While the invention has been particularly shown and described with respect to preferred embodiments and variations thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:

Japanese Patent Application No. 2007-79157 filed Mar. 26, 2007

The invention claimed is:

1. An image processing apparatus, comprising:

a color conversion unit that converts an image in a color space expressed by three primary color signals into an image in a color space expressed by a first brightness signal and a plurality of color difference signals;

a first brightness conversion unit that converts the first brightness signal into a second brightness signal in each of a plurality of areas that is divided based upon hue component determined by the color difference signals;

a gradation conversion unit that executes gradation conversion processing on the second brightness signal;

a modulation unit that executes modulation processing on the color difference signals by multiplying the color difference signals by modulation features; and a second brightness conversion unit that converts the second brightness signal, on which gradation conversion has been executed by the gradation conversion unit, into the first brightness signal in each of the plurality of areas that is divided based upon hue component determined by the color difference signals, wherein:

the second brightness signal includes a feature in which an upper limit of the color space expressed by the three primary color signals is determined based upon only the second brightness signal.

2. An image processing method, comprising:

executing a color conversion processing on an image in a color space expressed by three primary color signals by converting into an image in a color space expressed by a first brightness signal and a plurality of color difference signals;

executing a first brightness conversion processing on the first brightness signal by converting it into a second brightness signal in each of a plurality of areas that is divided based upon hue component determined by the color difference signals;

executing a gradation conversion processing on the second brightness signal;

executing a modulation processing on the color difference signals by multiplying the color difference signals by modulation features; and executing a second brightness conversion processing on the second brightness signal having been processed by the gradation conversion processing, by converting it into the first brightness signal in each of the plurality of areas that is divided based upon hue component determined by the color difference signals, wherein:

the second brightness signal includes a feature in which an upper limit of the color space expressed by the three primary color signals is determined based upon only the second brightness signal.

* * * * *